United States Patent
Aridome et al.

(10) Patent No.: US 7,469,094 B2
(45) Date of Patent: Dec. 23, 2008

(54) MEDIUM RECORDING METHOD, MEDIUM RECORDING DEVICE, AND INFORMATION RECORDING MEDIUM

(75) Inventors: Kenichiro Aridome, Kanagawa (JP); Shingo Yoshioka, Kanagawa (JP); Katsumi Matsuno, Kanagawa (JP); Akinobu Sugino, Kanagawa (JP)

(73) Assignee: Sony Corporation, Tokyo (JP)

( * ) Notice: Subject to any disclaimer, the term of this patent is extended or adjusted under 35 U.S.C. 154(b) by 721 days.

(21) Appl. No.: 10/485,424

(22) PCT Filed: May 23, 2003

(86) PCT No.: PCT/JP03/06489

§ 371 (c)(1),
(2), (4) Date: May 7, 2004

(87) PCT Pub. No.: WO03/102954

PCT Pub. Date: Dec. 11, 2003

(65) Prior Publication Data
US 2005/0078945 A1    Apr. 14, 2005

(30) Foreign Application Priority Data
Jun. 4, 2002    (JP) ............................ 2002-163537

(51) Int. Cl.
*H04N 5/91*    (2006.01)
*H04N 5/93*    (2006.01)
*H04N 7/26*    (2006.01)
*H04N 5/00*    (2006.01)
*G11B 27/02*    (2006.01)
*G11B 27/36*    (2006.01)
*G11B 7/24*    (2006.01)
*G11B 5/09*    (2006.01)
*G11B 19/04*    (2006.01)

(52) U.S. Cl. ........................... 386/95; 386/52; 386/124; 386/125; 386/126; 369/47.13; 369/53.2; 369/275.3; 360/48; 360/60

(58) Field of Classification Search .................. 386/95, 386/52, 124, 125, 126; 369/47.13, 53.2, 369/275.3; 360/48, 60
See application file for complete search history.

(56) References Cited

U.S. PATENT DOCUMENTS 5,974,005 A    10/1999    Kato
(Continued)

FOREIGN PATENT DOCUMENTS

EP    0 845 780    6/1998
(Continued)

*Primary Examiner*—Thai Tran
*Assistant Examiner*—Syed Y Hasan
(74) *Attorney, Agent, or Firm*—Frommer Lawrence & Haug LLP; William S. Frommer; Ellen Marcie Emas (57) ABSTRACT

This invention is a recording medium recording method for an optical disc or the like. Every time one VTS is prepared, padding processing is executed to secure a recording area for new TMP_VMGI following that VTS and for VTSI and VTSM VOBS of the subsequent title. As, every time one VTS is prepared, new TMP_VMGI following that VTS is recorded, TMP_VMGI is recorded at the position that is added to the number of VTSs. Therefore, even when the management information becomes unreadable because of update exceeding the rewriting durability of the medium with respect to the recording area of TMP_VMGI on the innermost side, the management information can be read from TMP_VMGI recorded in the other recording areas and the finalizing processing can be executed.

11 Claims, 9 Drawing Sheets

U.S. PATENT DOCUMENTS

| | | | |
|---|---|---|---|
| 6,118,924 A * | 9/2000 | Nakatani et al. | 386/70 |
| 6,785,206 B1 * | 8/2004 | Lee et al. | 369/47.14 |
| 2002/0021890 A1 * | 2/2002 | Haino et al. | 386/95 |

FOREIGN PATENT DOCUMENTS

| | | |
|---|---|---|
| EP | 1 176 592 | 1/2002 |
| EP | 1 182 662 | 2/2002 |
| JP | 9-115246 | 5/1997 |
| JP | 2001-110055 | 4/2001 |
| JP | 2001-291367 | 10/2001 |
| JP | 2002-63765 | 2/2002 |

* cited by examiner

| Rzone 1 | Rzone 2 Invisible Rzone |

FIG.2B

| Rzone 1 | Rzone 2 | VTSTT VOBS | VTSI BUP |

FIG.2C

| Rzone 1 | VTSI | VTSM VOBS | VTSTT VOBS | VTSI BUP |

FIG.2D

| Rzone 1 | VTS #1 | Rzone 3 Invisible Rzone |

FIG.2E

| Rzone 1 | VTS #1 | Rzone 3 | VTSTT VOBS | VTSI BUP |

FIG.2F

| Rzone 1 | VTS #1 | VTSI | VTSM VOBS | VTSTT VOBS | VTSI BUP |

FIG.2G

| Rzone 1 | VTS #1 | VTS #2 |

FIG.2H

| LEAD-IN | UDF | VMG | VTS #1 | VTS #2 | ... | VTS #n | LEAD-OUT |

MEDIUM RECORDING METHOD, MEDIUM RECORDING DEVICE, AND INFORMATION RECORDING MEDIUM

TECHNICAL FIELD

This invention relates to an optical disc recording method, an optical disc recording apparatus, and an information recording medium for recording information to a rewritable optical disc such as DVD-RW (DVD-rewritable).

This application claims priority of Japanese Patent Application No. 2002-163537, filed on Jun. 4, 2002, the entirety of which is incorporated by reference herein.

BACKGROUND ART

Conventionally, as information-writable DVDs (digital versatile discs), which are large-capacity optical discs, DVD-R (DVD-recordable) on which information can be written once, DVD-RW (DVD-rewritable) on which information can be rewritable, and DVD-RAM (DVD-random access memory) are provided. As for DVD-R and DVD-RW of these optical discs, if video data is recorded in a format conformable to the DVD video format, the data can be reproduced by a playback-only optical disc player. This standard enables reading of data recorded on a disc in a computer that processes data, by supporting the standard of universal disk format (UDF).

Figure 1A:
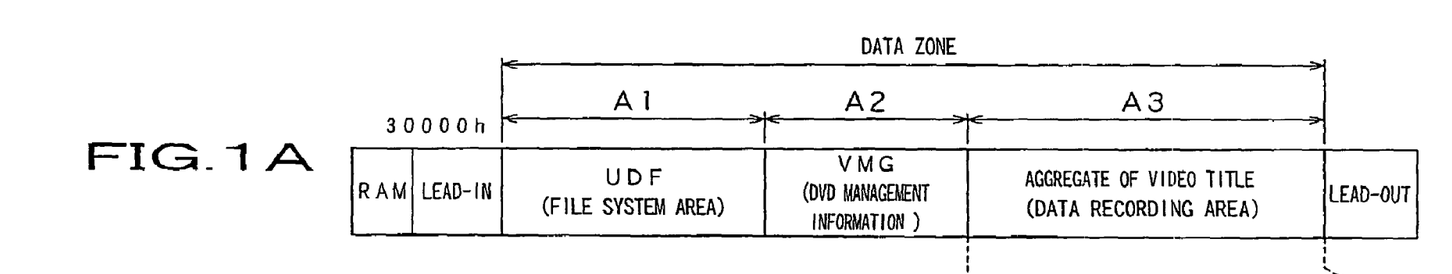
FIGS. 1A to 1C are charts for explaining the DVD video format.
Figure 1B:
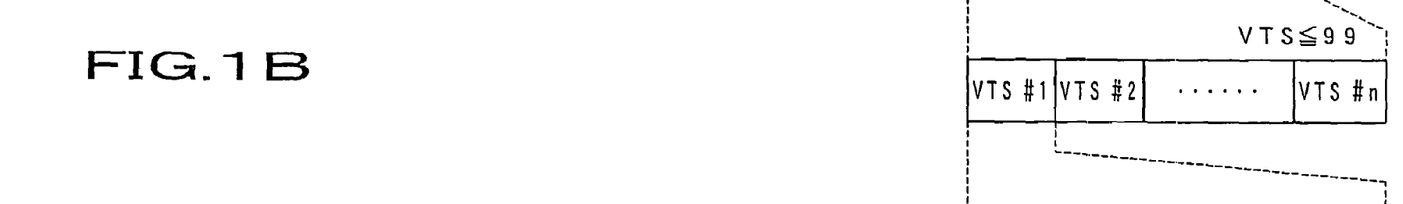
Figure 1C:
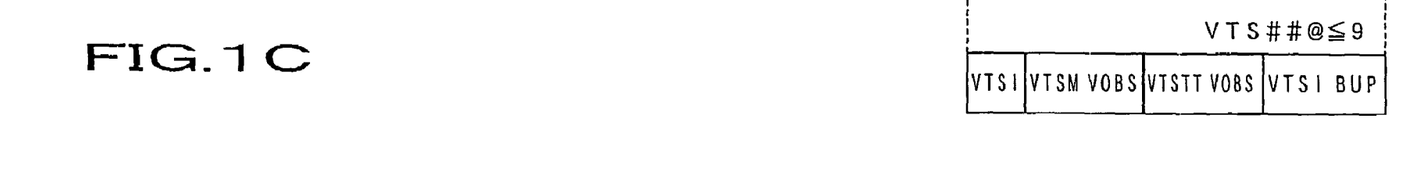

FIGS. 1A to 1C are views showing a logical format of an optical disc based on the DVD video format. The optical disc based on this format has its information recording surface sectioned into a lead-n area, a data zone, and a lead-out area, from the innermost side, which is the leading side, and desired video data is recorded in the data zone, as shown in FIG. 1A.

The data zone is sectioned into, from the lead-in side, a UDF (universal disk format) area A1, which is a file system area with a UDF bridge structure described therein, a VMG (video manager) area A2, which is a DVD management information area, and a real-time recording area A3. The UDF area and VMG area are management information recording areas for managing files based on video data recorded on this optical disc. Of these UDF area and VMG area, the second management information recording area, that is, the VMG area, is an area corresponding to a file management system proper to the DVD video format, and TOC information as management information for managing the whole video data recorded in the real-time data recording area A3 is recorded in this area. On the other hand, the first management information recording area, that is the UDF area A1, is an area corresponding to a file management system based on a computer, and management information for managing the whole video data recorded in the real-time data recording area A3 in a format that realizes compatibility with the file system in the computer is recorded in this area.

The real-time data recording area A3 is a user area for recording actual data, and video data is recorded by each VTS (video title set, hereinafter suitably referred to as title) as a unit in this area, as shown in FIG. 1B. 99 VTSs can be provided at the maximum. This VTS includes, from the leading side, VTSI (video title set information), VTSM VOBS (video object set for the VTSM), VTSTT VOBS (video object set for titles in a VTS), and VTSI BUP (backup of VTSI), as shown in FIG. 1C. In VTSTT VOBS, video data based on the MPEG (Moving Picture Experts Group) 2 format, which is actual data, is recorded. In VTSI, recording position information or the like, which is management information for managing video data based on this actual data, is recorded. In VTSTT VOBS, a title menu of video data is recorded. VTSTT VOBS is optional. VTSI BUP is a backup for VTSI.

With an optical disc of this type, when accessing data by using a computer, a desired file can be retrieved and reproduced on the basis of UDF, and when reproducing data by using a DVD player, a desired file can be retrieved and reproduced on the basis of VMG.

As a system for writing video data to such an optical disc, an incremental recording system (hereinafter referred to as INC system) or a restricted overwrite system (hereinafter referred to as ROW system) is used. The INC system is a system of sequentially recording video data. The ROW system is a system applied to an optical disc on which data can be overwritten. However, even in the ROW system, when recording data to an non-recorded area, video data is recorded sequentially. In the INC system and the ROW system, processing to the optical disc such as reservation is managed using RMA (recording management area) provided on the inner side of the lead-in area.

FIGS. 2A to 2H show recording procedure based on the INC system. In the INC system, it is defined that data can be written into a maximum of three areas at a time. Each of these areas is called R zone and each R zone is managed using RMA.

Figures 2A, 2B, 2C, 2D:
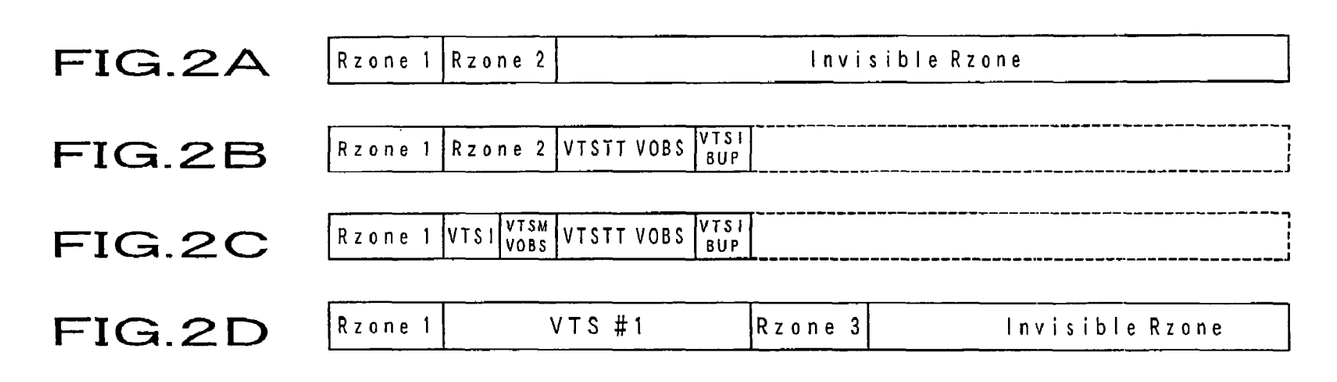
FIGS. 2A to 2H are charts for explaining recording based on the INC system.

Specifically, in the case of recording a motion picture in the INC system, R zones are reserved first, as shown in FIG. 2A. In executing the reservation of R zones, an R zone 1 area, which forms a UDF area and a VMG area as a management information recording area, is defined, and then an R zone 2 area, which forms VTSI and VTSM VOBS of the leading VTS, is defined in a non-recorded area, which forms a real-time data recording area. The remaining non-recorded area is defined as an Invisible R zone area. In the INC system, by reserving these R zone 1 and R zone 2, the management information recording area is secured and the area forming VTSI and VTSM VOBS of the leading VTS is secured.

In the INC system, VTSTT VBOS based on actual data is formed by sequentially recording video data from the leading side of the Invisible R zone. Moreover, when recording of actual data for one title is completed by a user's instruction, VTSI BUP is recorded after the recording of this actual data, as shown in FIG. 2B. Then, again from the leading side, VTSI and VTSM VOBS are formed in the R zone 2, as shown in FIG. 2C, and the R zone 2 is closed. In this manner, one VTS is recorded on the optical disc in the INC system.

Figures 2E, 2F, 2G, 2H:
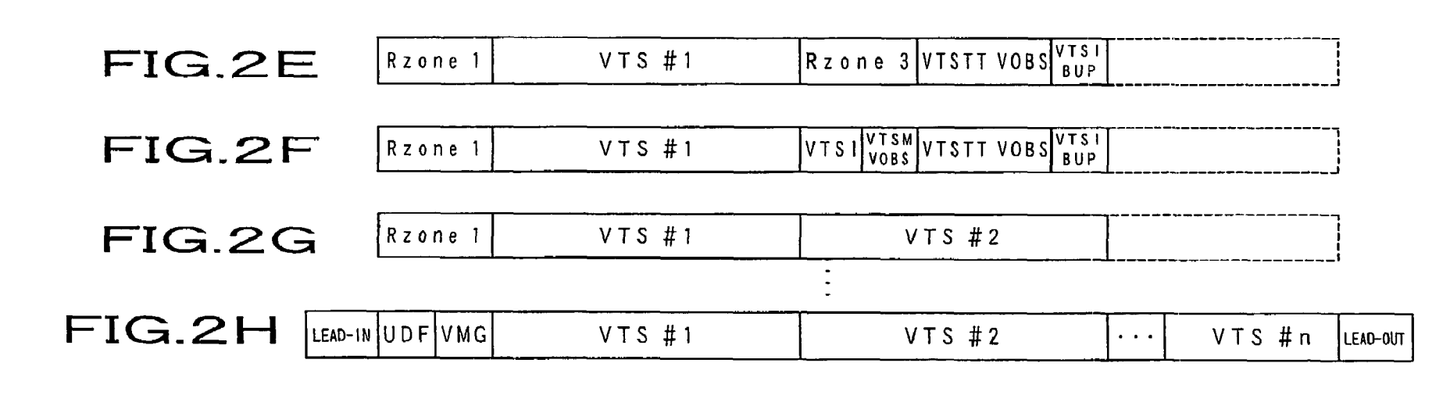

In the case of continuously recording the next title in the INC system, an R zone 3 is reserved in the remaining non-recorded area to secure VTSI and VTSM VOBS, and the Invisible R zone is defined, as shown in FIG. 2D. Then, after VTSTT VOBS is formed by recording actual data, VTSI BUP is formed, as shown in FIG. 2E, and VTSI and VTSM VOBS are formed in the previously secured area, as shown in FIG. 2F. In this manner, the subsequent VTS is recorded on the optical disc, as shown in FIG. 2G. In the INC system, in the case of recording subsequent titles, the non-recorded area is similarly defined and VTSs are sequentially recorded.

In the INC system, on the optical disc on which the real-time data recording area is formed by sequentially recording VTSs in this manner, a UDF area and a VMG area are formed by finalizing processing, and a lead-in area and a lead-out area are formed, as shown in FIG. 2H. This realizes compatibility with a playback-only optical disc. The formation of the UDF area and the VMG area is executed by generating UDF and VMG data from VTSI and VTSM VOBS of each title, then recording the data in the R zone 1, and closing the R zone 1.

Figure 3A:
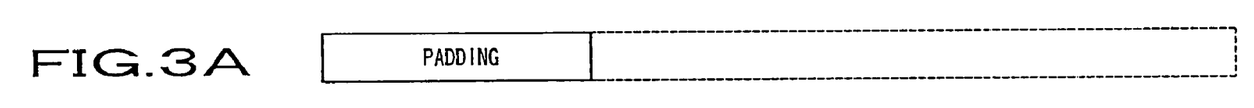
FIGS. 3A to 3G are charts for recording based on the ROW system.

FIGS. 3A to 3G show recording procedure based on the ROW system. In the ROW system, a recording area for lead-in, UDF, VMG, and VTSI and VTSM VOBS of the leading title is secured in advance by padding, as shown in FIG. 3A. Padding is the processing to secure an area by recording dummy data such as NULL.

Figure 3B:
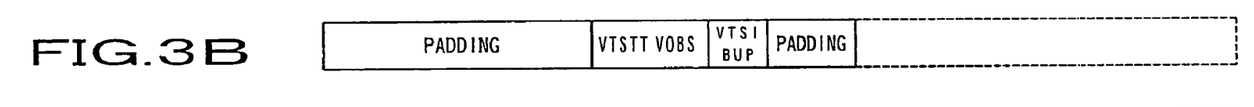
Figure 3C:
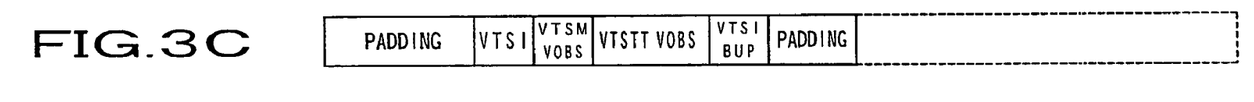

As these areas are secured in this manner, in the ROW system, VTSTT VOBS based on actual data is formed by sequentially recording video data, as shown in FIG. 3B. As recording of actual data of one title is completed, VTSI BUP is subsequently recorded, as shown in FIG. 3B. Then, to secure a recording area for VTSI and VTSM VOBS of a subsequent title, padding processing is executed. Again from the leading side, VTSI and VTSM VOBS corresponding to the recording of this actual data are formed, as shown in FIG. 3C. In this manner, one VTS is recorded on the optical disc in the ROW system.

Figure 3D:
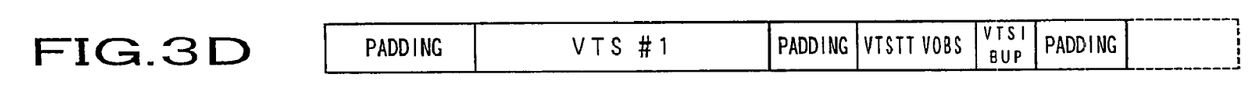
Figure 3E:
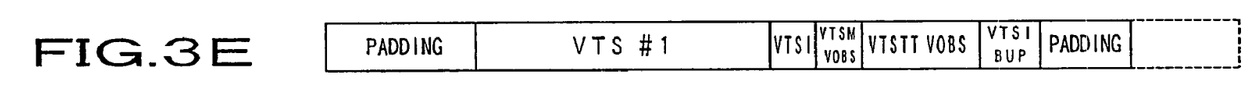
Figure 3F:
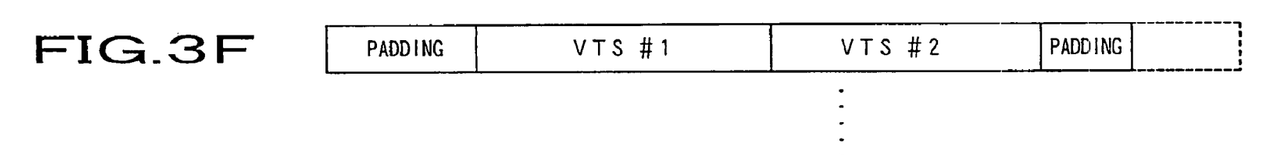

In the case of continuously recording the next title in the ROW system, VTSTT VOBS and VTSI BUP are formed by recording actual data, following the padding area formed by the VTS that is immediately before, as shown in FIG. 3D. To secure a recording area for VTSI and VTSM VOBS of a subsequent title, padding processing is executed. Next, VTSI and VTSM VOBS are formed, as shown in FIG. 3E, and the subsequent VTS is recorded on the optical disc, as shown in FIG. 3F. In the ROW system, in the case of recording subsequent titles, processing such as padding is similarly executed and VTSs are sequentially recorded.

Figure 3G:
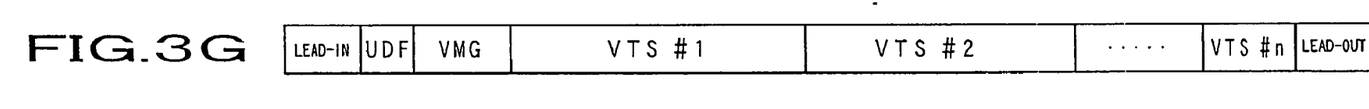

In the ROW system, on the optical disc on which the real-time data recording area is formed by sequentially recording VTSs in this manner, a UDF area and a VMG area are formed by finalizing processing similar to that of the INC system, and a lead-in area and a lead-out area are formed, as shown in FIG. 3G. This realizes compatibility with a playback-only optical disc.

Generally, in the case of recording data in the DVD video format to a DVD-RW medium, a file system for managing an intermediate state is necessary. If only recording conformable to the DVD video standard is performed, information managing VTSs is held in the file system for the intermediate state. Therefore, when a VTS is deleted, which LSN (logical sector number) on the medium has become free is managed. By utilizing this information, it is possible to newly record data to this position.

For example, JP-A-14-063765 discloses a technique of recording information to a DVD-R along real time in such a manner that the information can also be reproduced by a player for a playback-only DVD where information is recorded irrespective of real time. According to this disclosed technique, in the case of recording information to a DVD-R while conforming to the DVD video standard including at least a VTS containing VOBS to be reproduced and the corresponding VTSI, and VMGI for controlling reproduction of one or plural VTSs, the VTS is recorded to the DVD-R, and after recording the VTS, temporary VMGI is generated as temporary control information corresponding to the recorded VTS and adapted for later forming VMGI and recording the VMGI to the DVD-R. The generated temporary VMGI is recorded to the DVD-R every time a VTS is recorded to the DVD-R. By thus generating temporary control information and temporarily recording the temporary control information to the write-once recording medium when unit recording information is recorded, and by accurately recording original management control information later by using the temporary control information containing the latest contents, even if plural units of recording information are recorded on the write-once recording medium, it is possible to execute information recording to the write-once recording medium along real time in conformity with the recording format for a playback-only recording medium, which is not assumed to record information along real time.

Conventionally, in the case of realizing the DVD video format in a video recording apparatus using a rewritable optical disc medium, typically, temporary reproduction management information is recorded at a fixed address and a file system and reproduction information conformable to the DVD video format are recorded at the time of finalizing. In this method, the fixed address is frequently accessed and the rewriting durability of the medium may be exceeded in a short time. Once this management information becomes unreadable, the entire management information of the disc will be lost.

DISCLOSURE OF THE INVENTION

It is an object of the present invention to provide an optical disc recording method and an optical disc recording apparatus that are new and enable solution to the problem of the conventional optical disc recording method, and also to provide an information recording medium on which a program executing the optical disc recording method is recorded.

It is another object of the present invention to provide an optical disc recording method and an optical disc recording apparatus that enable a restoration operation even when a fixed address becomes unreadable, and an information recording medium on which a program executing the optical disc recording method is recorded.

According to the present invention, there is provided an optical disc recording method for recording a set made up of a file to be recorded and management information of the file into a user area on a rewritable optical disc while conforming to a recording format for a playback-only recording medium including at least a file containing recording information to be reproduced and management information for managing the recording information, and file management information for managing one or plural files, the method comprising: securing a recording area for temporary management information for managing the file recorded in the user area, management information conformable to the recording format of the playback-only recording medium, and management information for managing recording information of the file to be recorded; recording the temporary management information for managing the file to the recording area and subsequently recording the recording information of the file to be recorded to the recording area; recording the management information for managing the recording information of the file to the recording area so as to close the file, then securing a recording area for the temporary management information for managing the file and management information for managing recording information of a file to be recorded next, then recording the temporary management information for managing the file to the recording area, and rewriting the previously recorded temporary management information with the latest temporary management information; and every time a file is recorded, securing a recording area for the temporary management information for managing the file and management information for managing recording information of a file to be recorded next, then recording the temporary management information for managing the file to the recording area, and updating the temporary management information recorded at least on the innermost side.

According to the present invention, there is provided an optical disc recording apparatus for recording a set made up of a file to be recorded and management information of the file into a user area on a rewritable optical disc while conforming to a recording format for a playback-only recording medium including at least a file containing recording information to be reproduced and management information for managing the recording information, and file management information for managing one or plural files, the apparatus comprising: management information generation means for generating management information of a file to be recorded; recording means for recording the set made up of the file and the management information of the file into the user area of the optical disc; and control means for controlling operation of at least the management information generation means and the recording means. The control means secures a recording area for temporary management information for managing the file recorded in the user area, management information conformable to the recording format of the playback-only recording medium, and management information for managing recording information of the file to be recorded, then records the temporary management information for managing the file to the recording area, subsequently records the recording information of the file to be recorded to the recording area, then records the management information for managing the recording information of the file to the recording area so as to close the file, then secures a recording area for the temporary management information for managing the file and management information for managing recording information of a file to be recorded next, then records the temporary management information for managing the file to the recording area, and rewriting the previously recorded temporary management information with the latest temporary management information, and every time a file is recorded, the control means secures a recording area for the temporary management information for managing the file and management information for managing recording information of a file to be recorded next, then records the temporary management information for managing the file to the recording area, and updates the temporary management information recorded at least on the innermost side.

According to the present invention, there is provided a control program recorded to be readable by a control computer, the control computer controlling operation of management information generation means for generating management information of a file to be recorded and recording means for recording a set of a file and management information of the file into a user area of an optical disc, the management information generation means and the recording means being provided in an optical disc recording apparatus for recording the set made up of the file to be recorded and the management information of the file into the user area on the optical disc, the control program causing the control computer to function as control means for performing control to secure a recording area for temporary management information for managing the file recorded in the user area, management information conformable to the recording format of the playback-only recording medium, and management information for managing recording information of the file to be recorded, then record the temporary management information for managing the file to the recording area, subsequently record the recording information of the file to be recorded to the recording area, then record the management information for managing the recording information of the file to the recording area so as to close the file, then secure a recording area for the temporary management information for managing the file and management information for managing recording information of a file to be recorded next, then record the temporary management information for managing the file to the recording area, and rewrite the previously recorded temporary management information with the latest temporary management information, and every time a file is recorded, to secure a recording area for the temporary management information for managing the file and management information for managing recording information of a file to be recorded next, then record the temporary management information for managing the file to the recording area, and update the temporary management information recorded at least on the innermost side.

The other objects of the present invention and specific advantages provided by the present invention will be further clarified by the following description of an embodiment described with reference to the drawings.

BEST MODE FOR CARRYING OUT THE INVENTION

Hereinafter, an embodiment of this invention will be described in detail with reference to the drawings.

Figure 4:
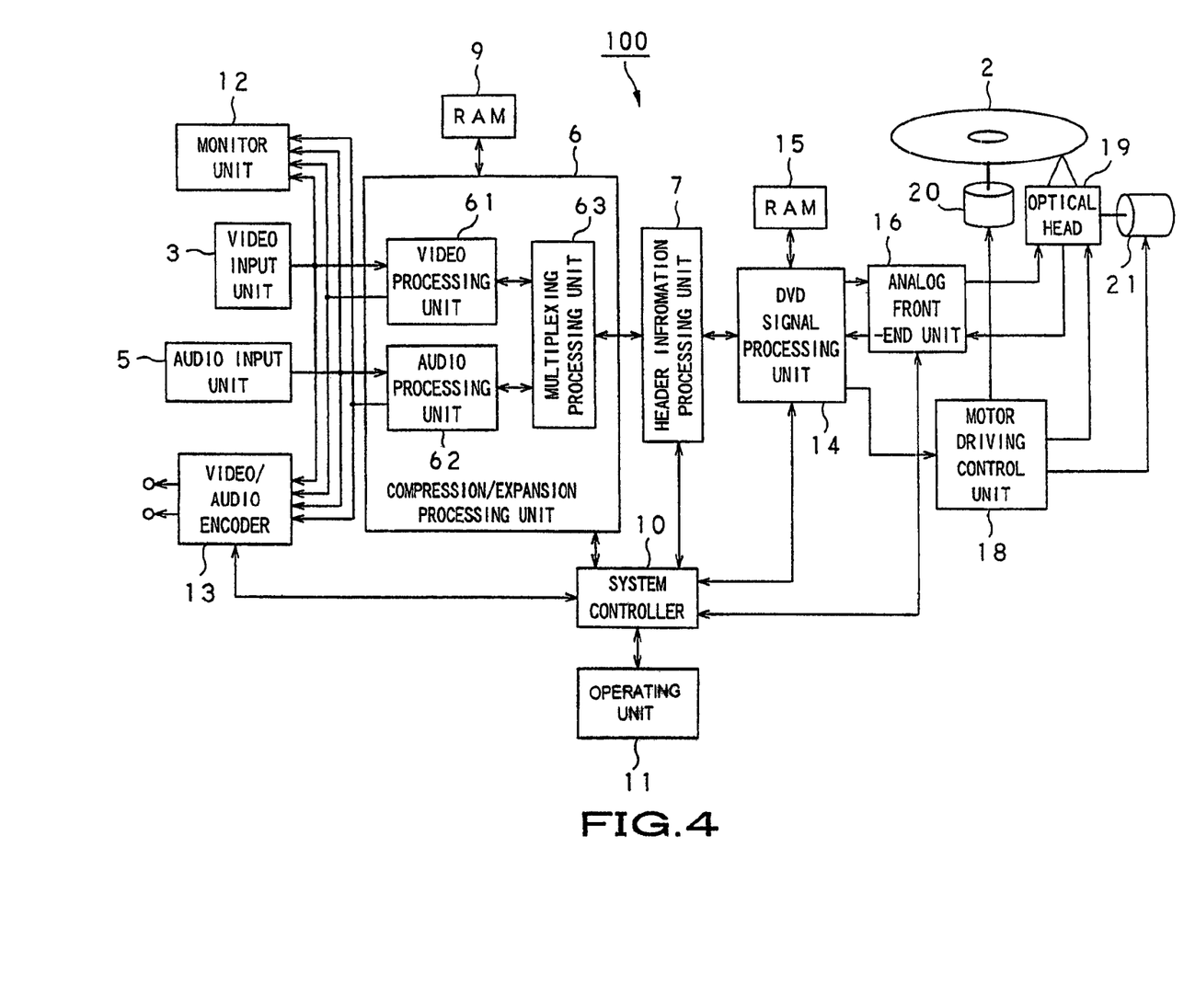
FIG. 4 is a block diagram showing the structure of an optical disc recording/reproducing apparatus to which the present invention is applied.

This invention is applied to an optical disc recording/reproducing apparatus 100 having, for example, a structure as shown in FIG. 4.

The optical disc recording/reproducing apparatus 100 shown in FIG. 4 is a portable video recorder with an integrated camera and records the result of image pickup in the ROW system, using an optical disc 2, for example, a DVD-RW (DVD-rewritable) as a recording medium.

This optical disc recording/reproducing apparatus 100 has a video input unit 3, an audio input unit 5, a compression/expansion processing unit 6, a header information processing unit 7, random access memories (RAMs) 9 and 15, a system controller 10, an operating unit 11, a monitor unit 12, a video/audio encoder 13, a DVD signal processing unit 14, an analog front-end unit 16, a motor driving control unit 18, an optical head 19, a spindle motor 20, a thread motor 21 and the like. The compression/expansion processing unit 6 includes a video processing unit 61, an audio processing unit 62, and a multiplexing processing unit 63.

In this optical disc recording/reproducing apparatus 100, the video input unit 3 generates video data by converting a video signal as the result of image pickup acquired from image pickup means, not shown, or a video signal inputted from an external device, to a digital signal, and supplies the video data to the compression/expansion processing unit 6, the monitor unit 12, and the video/audio encoder 13. To the video input unit 3, video data acquired as the result of image pickup by built-in image pickup means is inputted in accordance with the control by the system controller 10.

The audio input unit 5 generates audio data by converting an audio signal acquired from a microphone or an externally inputted audio signal to a digital signal, and supplies the audio data to the compression/expansion processing unit 6, the monitor unit 12, and the video/audio encoder 13.

The compression/expansion processing unit 6 has its operation switched under the control of the system controller 10. At the time of recording, the compression/expansion processing unit 6 compresses and multiplexes video data and audio data, using the random access memory 9, and outputs the resulting data to the header information processing unit 7. At the time of reproduction, the compression/expansion processing unit 6 separates video data and audio data of data acquired from the header information processing unit 7, using the random access memory 9. After that, it expands the respective data and outputs the expanded data to the monitor unit 12 and the video/audio encoder 13.

Specifically, in the compression/expansion processing unit 6, the video processing unit 61, at the time of recording, compresses video data outputted from the video input unit 3 and outputs the compressed video data under the control of the system controller 10. If the video data is a motion picture, data compression is performed using the MPEG2 format. At the time of reproduction, the video processing unit 61 expands video data outputted from the multiplexing processing unit 63 in accordance with its data compression format and outputs the expanded video data. The audio processing unit 62, at the time of recording, compresses audio data inputted from the audio input unit 5 using a format such as MPEG, Dolby audio or linear PCM, and outputs the compressed audio data. At the time of reproduction, the audio processing unit 62 expands audio data acquired from the multiplexing processing unit 63 and outputs the expanded audio data. The multiplexing processing unit 63, at the time of recording, performs time-division multiplexing of video data outputted from the video processing unit 61 and audio data outputted from the audio processing unit 62 and outputs the resulting data to the header information processing unit 7. At the time of reproduction, the multiplexing processing unit 63 separates video data and audio data of time-vision multiplexed data outputted from the header information processing unit 7 and outputs the respective data to the video processing unit 61 and the audio processing unit 62.

The monitor unit 12 includes a display mechanism and an audio processing mechanism for monitoring video data inputted from the video input unit 3, audio data inputted from the audio input unit 5, or video and audio data outputted from the compression/expansion processing unit 6. In this optical disc recording/reproducing apparatus 100, the monitor unit 12 can monitor the result of image pickup and the result of reproduction.

The video/audio encoder 13 compresses video data and audio data inputted from the audio input unit 5 or video data and audio data outputted from the compression/expansion processing unit 6, using a predetermined format, and outputs the compressed data to an external device. This enables monitoring of the result of image pickup and the result of reproduction by the optical disc recording/reproducing apparatus 100, on the external device.

The header information processing unit 7, at the time of recording, receives time-division multiplexed data outputted from the compression/expansion processing unit 6, and adds header information or the like proper to the DVD to the data and outputs the resulting data under the control of the system controller 10. The header information processing unit 7 generated data such as UDF, VMG and VTSI based on information from the system controller 10 and outputs the generated data to the DVD signal processing unit 14. At the time of reproduction, the header information processing unit 7 separates header information added at the time of recording, from output data of the DVD signal processing unit 14, and outputs the header information to the compression/expansion processing unit 6. The system controller 10 is notified of this separated header information.

The DVD signal processing unit 14, at the time of recording, generates an error correcting code based on output data to the header information processing unit 7, using the random access memory 15, and adds this error correcting code to the output data. The DVD signal processing unit 14 performs processing such as scrambling or 8/15 modulation and outputs a data string based on the result of the processing, in the form of a serial data string, to the analog front-end unit 16. At the time of reproduction, contrary to the case of recording, the DVD signal processing unit 14 performs decoding processing, descrambling processing and error correction processing of output data of the analog front-end unit 16, and outputs the result of the processing to the header information processing unit 7. The DVD signal processing unit 14 performs digital-to-analog conversion of various driving information for spindle control, tracking control, focusing control and thread control outputted from the system controller 10 so as to generate driving signals of these, and outputs these driving signals to the motor driving control unit 18.

The analog front-end unit 16 generates and outputs a light quantity control signal with respect to a laser beam irradiation onto the optical disc 2 from the optical head 19. The analog front-end unit 16, at the time of reproduction, holds a constant quantity of light for reproduction with respect to the laser beam irradiation onto the optical disc 2 from the optical head 19 in accordance with the light quantity control signal. On the other hand, at the time of recording, the analog front-end unit 16 changes the signal level of the light quantity control signal in accordance with output data from the DVD signal processing unit 14 and intermittently increases the quantity of light of the laser beam from the quantity of light for reproduction to the quantity of light for recording in accordance with the output data from the DVD signal processing unit 14.

The analog front-end unit 16 amplifies the result of reception of return light acquired from the optical head 19 and performs arithmetic processing of the result, thereby generating a reproduction signal with its signal level changing in accordance with a bit string formed on the optical disc 2. By performing signal processing of this reproduction signal, the analog front-end unit 16 outputs reproduction data, which is the result of binary identification of this reproduction signal, to the DVD signal processing unit 14. Moreover, by performing this arithmetic processing, the analog front-end unit 16 generates a tracking error signal, a focusing error signal and the like with their signal levels changing in accordance with the quantity of tracking error and the quantity of focusing error, and outputs these signals in the form of digital signals to the system controller 10.

The motor driving control unit 18 drives respective mechanism corresponding to the driving signals outputted from the DVD signal processing unit 14. Specifically, in accordance with the driving signal for spindle control and the driving signal for thread control of these driving signals, the motor driving control unit 18 rotationally drives the spindle motor 20 and the thread motor 21. The motor driving control unit 18 also drives an actuator provided in the optical head 19 in accordance with the driving signal for tracking control and the driving signal for focusing control.

The spindle motor 20 holds and rotationally drives the optical disc 2 at a predetermined rotational speed. The thread motor 21 moves the optical head 19 in the radial direction of the optical disc 2.

The optical head 19 emits a laser beam from a built-in semiconductor laser in accordance with the light quantity control signal outputted from the analog front-end unit 16 and condenses the laser beam on the information recording surface of the optical disc 2 via an objective lens. The optical head 19 also guides return light acquired from the optical disc 2 by irradiating the laser beam thereon, to a predetermined light-receiving element via the objective lens, and outputs the result of light reception by the light-receiving element to the analog front-end unit 16. The objective lens of the optical head 19 can be moved by the actuator driven by the driving signal for tracking control and the driving signal for focusing control. The optical head 19 can thus perform tracking control and focusing control. The quantity of light of the laser beam is intermittently increased in accordance with the light quantity control signal, thus locally raising the temperature of the signal recording surface of the optical disc 2 so as to record desired data.

The system controller 10 includes a computer for controlling the operation of the whole optical disc recording/reproducing apparatus 100. The system controller 10 controls the operation of each unit by executing a processing program installed in advance in the optical disc recording/reproducing apparatus 100, and through an operation input from the user via the operating unit 11, and in accordance with various signals detected by the analog front-end unit 16. Specifically, the system controller 10 generates driving information for tracking control and for focusing control on the basis of the tracking error signal and the focusing error signal detected by the analog front-end unit 16, and causes the DVD signal processing unit 14 to convert the driving information to analog signals and output these analog signals to the motor driving unit 18, thus performing tracking control and focusing control processing. The system controller 10 also detects a laser beam irradiating position based on the header information or the like detected by the header information unit 7, then generates driving information for thread control based on the result of the detection, and outputs this driving information to the DVD signal processing unit 14, thus performing seek processing or the like. Similarly, the system controller 10 performs spindle control processing.

Figure 5:
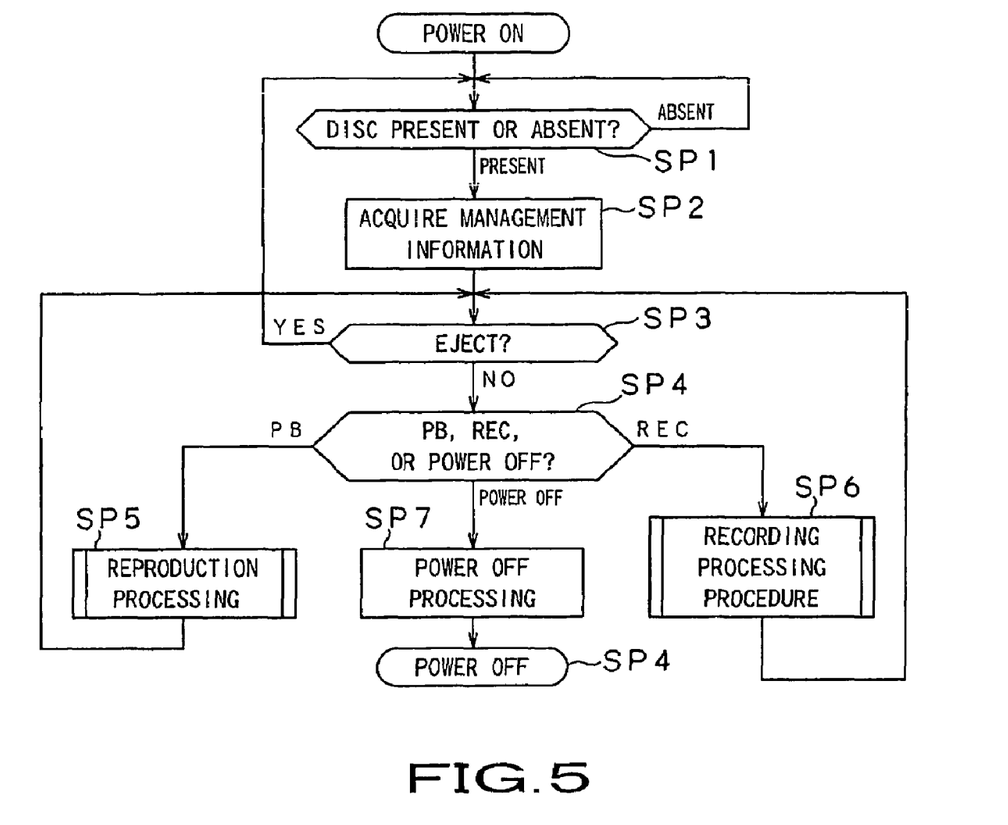
FIG. 5 is a flowchart showing processing procedure executed at the time of turning on power in the optical disc recording/reproducing apparatus according to the present invention.

On the assumption of such processing with respect to the optical disc 2, the processing procedure shown in FIG. 5 is carried out as the power is turned on. Specifically, when the power is turned on, the system controller 10 at step SP1 judges the presence/absence of the optical disc 2 from the result of detection by a detecting mechanism for the optical disc 2, not shown. If the result is negative at step SP1, the system controller 10 repeats step SP1. On the other hand, if the power is turned on in the state where the optical disc 2 has already been loaded, or if the optical disc 2 is loaded after the power is turned on, the result is positive at step SP1 and the processing shifts to step SP2. If the power is turned off while the system controller 10 is repeating step SP1, the system controller 10 shifts directly to step SP4 and ends this processing procedure.

At step SP2, the system controller 10 drives the thread motor 21 to move the optical head 19 to the innermost circle of the optical disc 2 and acquires the result of reproduction of the innermost circle side from the DVD signal processing unit 14, thereby acquiring VMG data in the case where the optical disc 2 has been finalized. If the optical disc 2 has not been finalized yet, the system controller 10 acquires RMA information. If it is judged from this RMA information that data has already been recorded in a real-time data recording area on the optical disc 2, the system controller 10 searches the optical disc 2 to acquire VTSI and VTSTT VOBS data of each VTS. By doing so, the system controller 10 acquires management information for the optical disc 2, which is necessary for recording and reproduction of the optical disc 2, as in an optical disc apparatus for recording and reproducing an ordinary DVD.

Also in this processing, the system controller 10 acquires UDF data in addition to VMG data, and records and holds the series of acquired management information in a built-in memory.

Next, the system controller 10 shifts to step SP3 and judges whether ejection of the optical disc 2 is designated or not. If the result is positive at this step, the system controller 10 instructs a loading mechanism, not shown, to eject the optical disc 2, and then returns to step SP1.

On the other hand, if designation other than ejection of the optical disc 2 is made by the user, the system controller 10 shifts from step SP3 to step SP4 and judges whether the user's operation is an operation to designate recording (indicated by REC), an operation to designate reproduction (indicated by PB), or an operation to designate turning off of the power (indicated by Power OFF). If the user's operation is the operation to designate reproduction, the system controller 10 shifts from step SP4 to step SP5, then executes reproduction processing procedure to reproduce a file recorded on the optical disc 2, and returns to step SP4.

On the other hand, if the user's operation is the operation to designate recording, the system controller 10 shifts from step SP4 to step SP6, then executes recording processing procedure to record an image to the optical disc 2, and returns to step SP4. In the case where the optical disc 2 has been finalized with UDF and VMG formed thereon, since the optical disc 2 has been processed to inhibit recording of data, the system controller 10 returns to step SP4 without executing the recording processing procedure. Even in the case where the optical disc has been finalized, if the optical disc 2 is an erasable DVD-RW, the system controller 10 erases recorded data after confirmation to the user, and executes the recording processing procedure.

Meanwhile, if the user's operation is the operation to turn off the power, the system controller 10 shifts from step SP4 to step SP7, then executes power off processing, and ends this processing procedure.

In the recording processing procedure of the processing procedure thus executed, the system controller 10 records an image file in the ROW system if the optical disc 2 is a DVD-RW.

Figure 6:
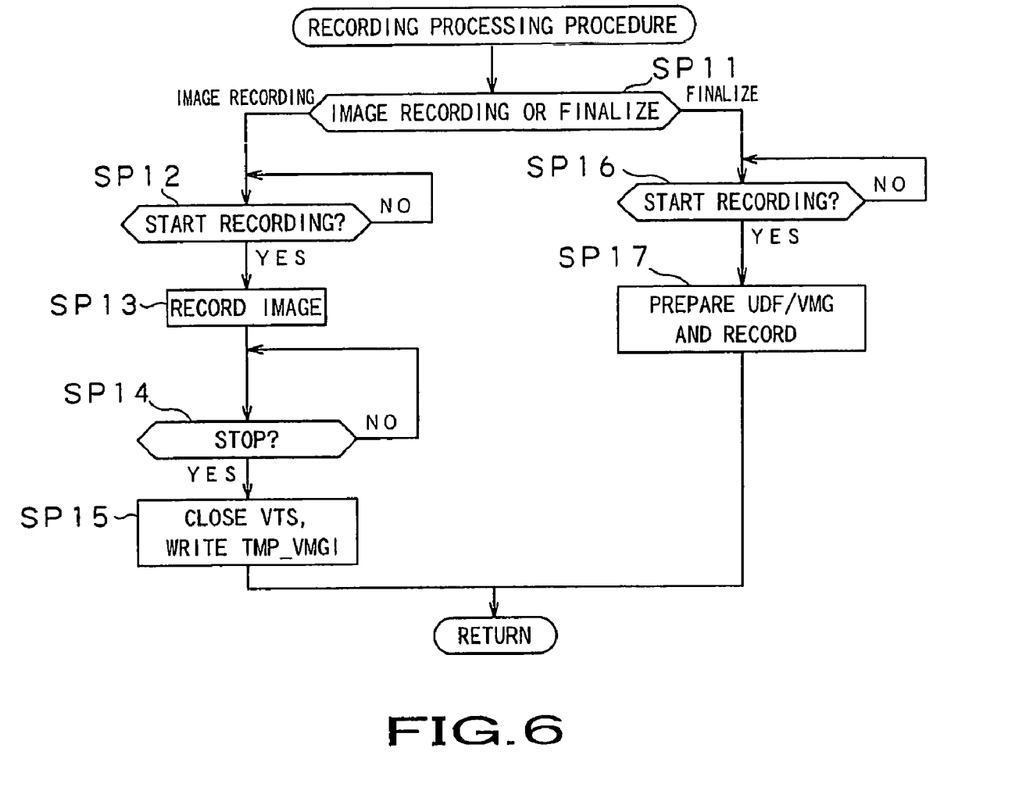
FIG. 6 is a view for explaining image file recording processing based on the ROW system in the optical disc recording/reproducing apparatus according to the present invention.

FIG. 6 is a flowchart showing the recording processing procedure. In this recording processing procedure, first, the system controller 10 at the first step SP11, judges whether the user's designation of recording is related to image recording or is related to finalizing processing.

If the user's designation of recording is related to image recording, the system controller 10 shifts to step SP12 and judges whether start of recording has been designated by the user or not. If the result is negative at this step, the system controller 10 repeats step SP12. On the other hand, if the result is positive, the system controller 10 shifts from step SP12 to step SP13 and records VTSTT VOBS based on actual data.

Moreover, the system controller 10 shifts to step SP14 and judges whether stop of recording has been designated by the user or not. If the result is negative at this step, the system controller 10 returns to step SP13. The system controller 10 thus repeats the processing procedure of steps SP13-SP14-SP13 to sequentially record actual data. When a positive result is obtained at step SPl4, the recording of actual data VTSTT VOBS is completed.

Next, the system controller 10 shifts to step SP15. The system controller 10 sequentially forms VTSI BUP, VTSI, and VTSM VOBS and thus records one VTS. The system controller 10 then updates TMP_VMGI and ends this recording processing procedure.

On the other hand, if the user's designation of recording is related to finalizing processing, the system controller 10 shifts from step SP11 to step SP16 and judges whether start of recording has been designated by the user or not. If the result is negative at this step, the system controller 10 repeats step SP16. However, if the result is positive, the system controller 10 shifts from step SP16 to step SP17 to execute finalizing processing and ends this processing procedure.

Figure 7A:
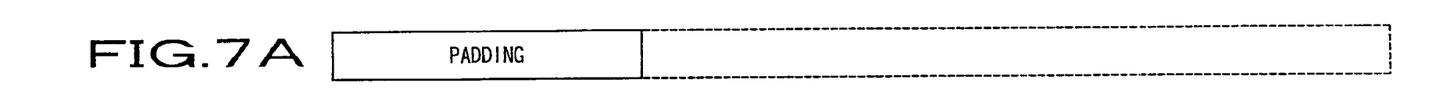
FIGS. 7A to 7G are views for explaining image file recording processing based on the ROW system.

FIGS. 7A to 7G are views for explaining image file recording processing based on this ROW system, for example, in the case where the optical disc 2 is a so-called virgin disc having no files recorded thereon. The system controller 10 updates RMA information acquired from the optical disc 2 and held in the memory, thereby securing, in advance, a recording area for lead-in, UDF, TMP_VMGI, and VTSI and VTSM VOBS of the leading title on the innermost circle side on the disc by padding, as shown in FIG. 7A. Padding is the processing to record dummy data such as NULL to secure an area.

Figure 7B:
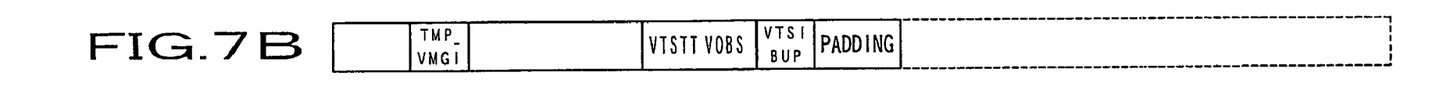
Figure 7C:
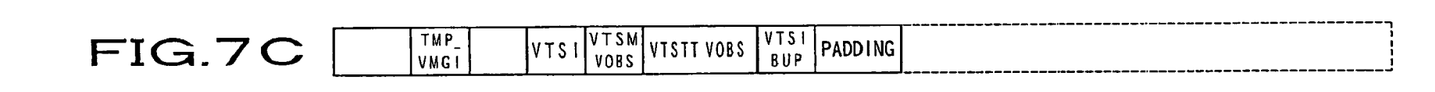

As shown in FIG. 7B, as VTSTT VOBS based on actual data is formed by sequentially recording video data and recording of actual data for one title is completed, VTSI BUP is subsequently recorded. To secure a recording area for VTSI and VTSM VOBS of the next title, padding processing is carried out. Next, again from the leading end, TMP_VMGI is updated, and VTSI and VTSM VOBS corresponding to this recording of actual data are formed, as shown in FIG. 7C. In this manner, one VTS is recorded onto the optical disc.

Specifically, as start of recording is designated by the user at step SP12, the system controller 10 records VTSTT VOBS based on actual data, as shown in FIG. 7B. As stop of recording is designated by the user at the above-described step SP14, the system controller 10 completes recording of actual data VTSTT VOBS, as shown in FIG. 7C. Then, at the above-described step SP15, the system controller 10 sequentially forms VTSI BUP, VTSI, and VTSM VOBS, thus recording one VTS, and then updates TMP_VMGI.

Figure 7D:
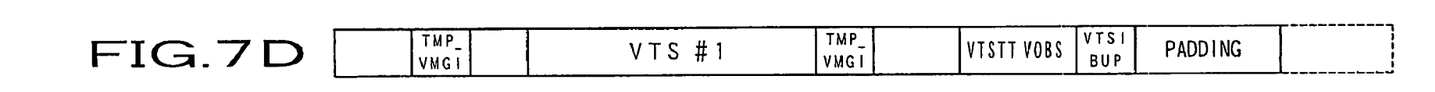
Figure 7E:
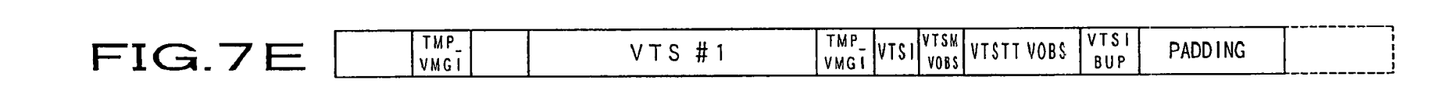

In the case of continuously recording the next title, VTSTT VOBS and VTSI BUP are formed by recording actual data, following the padding area formed by the VTS that is immediately before, and padding processing is carried out to secure a recording area for TMP_VMGI and VTSI and VTSM VOBS of the subsequent title, as shown in FIGS. 7D and 7E.

TMP_VMGI is temporary VMGI recorded together with VTSI when recording of one title is completed. TMP_VMGI includes information such as the number of VTSs recorded on the disc and the disc name, and information such as physical location of VTSs and title names of 99 titles. This TMP_VMGI is updated to the latest information for all the titles (VTSs) recorded in the past.

Figure 7F:
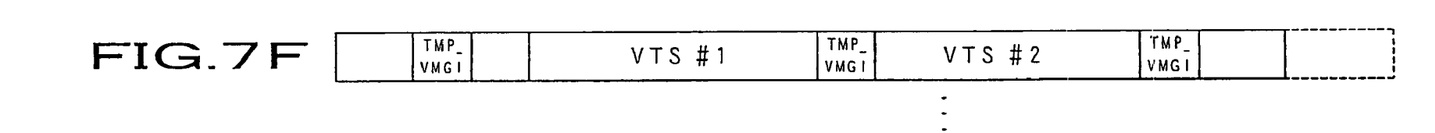

In the example shown in FIG. 7, every time one VTS is prepared, new TMP_VMGI of the subsequent VTS is recorded in addition to the TMP_VMGI on the innermost circle side, and all TMP_VMGI is updated to the latest information, as shown in FIG. 7F.

In this manner, the system controller 10 sequentially records titles. In the case where an optical disc 2 that has not been finalized yet is loaded and data is to be additionally written to this optical disc 2, similar processing using RMA data acquired at step SP2 of FIG. 5 and held in the memory is carried out, starting at the end of the already recorded titles. Thus, an image as a result of image pickup is additionally written.

On the other hand, in the finalizing processing, UDF and VMG are generated based on the management information thus generated and held in the memory, and lead-in and lead-out are generated.

In the case where data is additionally written to the optical disc 2 that has not been finalized yet, UDF and VMG data for the titles already recorded on the optical disc 2 are generated, using VTSI, TMP_VMGI, and VTSTT VOBS acquired at step SP2 of FIG. 5.

Figure 7G:
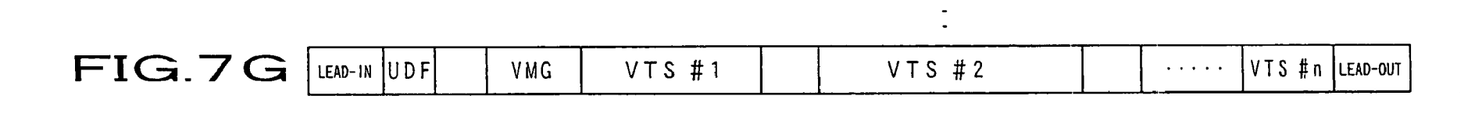
Figure 8A:
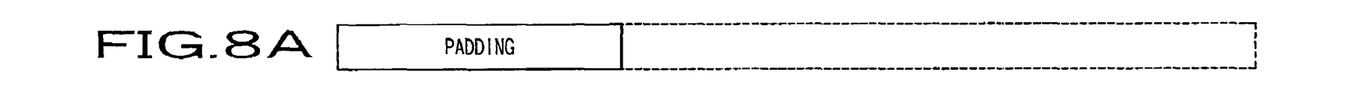
FIGS. 8A to 8G are view for explaining another example of image file recording processing based on the ROW system.
Figure 8B:
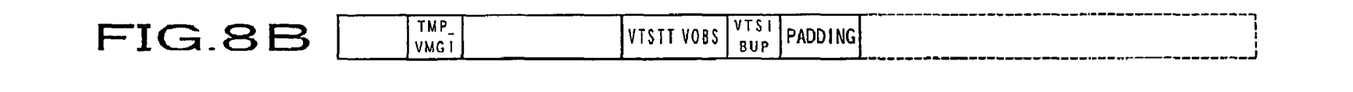
Figure 8C:
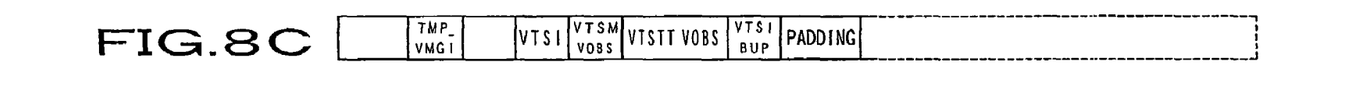
Figure 8D:
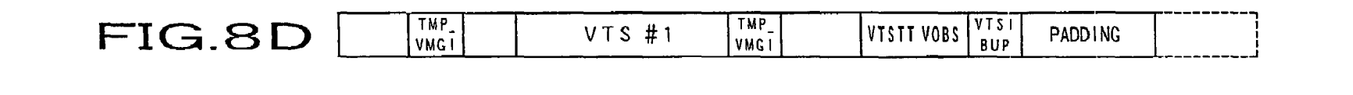
Figure 8E:
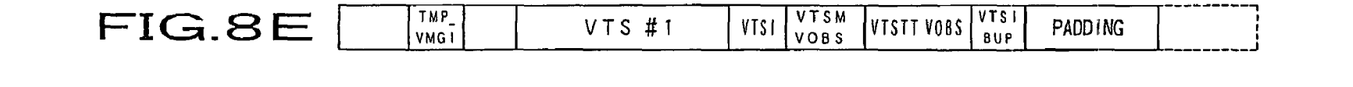
Figure 8F:
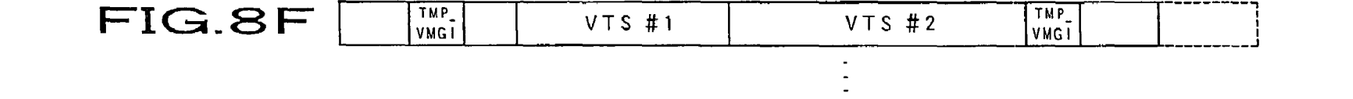
Figure 8G:
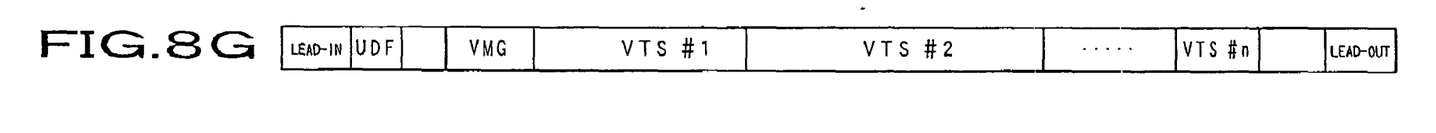

For the optical disc on which the real-time data recording area is formed by sequentially recording VTSs in the above-described manner, a UDF area and a VMG area are formed by the finalizing processing, and a lead-in area and a lead-out area are formed, as shown in FIG. 7G. This realizes compatibility with a playback-only optical disc.

Specifically, as finalizing processing is designated by the user at step SP11 and start of recording is designated by the user at step SP16, the system controller 10 executes the finalizing processing to form a UDF area and a VMG area and to form a lead-in area and a lead-out area, as shown in FIGS. 7A-7G.

In the example shown in FIG. 7, every time one VTS is prepared, padding processing is executed to secure a recording area for new TMP_VMGI following that VTS and for VTSI and VTSM VOBS of the subsequent title. As, every time one VTS is prepared, new TMP_VMGI following that VTS is recorded, TMP_VMGI is recorded at the position that is added to the number of VTSs. Therefore, even when the management information becomes unreadable because of update exceeding the rewriting durability of the medium with respect to the recording area of TMP_VMGI on the innermost side, the management information can be read from TMP_VMGI recorded in the other recording areas and the finalizing processing can be executed.

In the above-described example shown in FIG. 7, every time one VTS is prepared, new TMP_VMGI following that VTS is recorded and all TMP_VMGI is updated to the latest information. However, it is possible to update only TMP_VMGI at two positions, that is, TMP_VMGI on the innermost side and TMP_VMGI on the outermost side.

Alternatively, as shown in FIGS. 8A to 8G, the size of VTSI and VTSM VOBS of a title following that VTS is defined as the size of the recording area to be secured by padding processing, and the latest TMP_VMGI is recorded into the recording area secured by the padding processing every time one VTS is prepared. TMP_VMGI on the innermost side is updated, and VTSTT VOBS and VTSI BUP constituting the next VTS are sequentially formed so as to record one VTS. VTSI and VTSM VOBS are recorded into the recording area secured by the padding processing. Specifically, by overwriting the above-described TMP_VMGI, then closing the VTS, then securing the recording area by padding processing, recording the latest TMP_VMGI, and updating TMP_VMGI on the innermost side, it is possible to update only TMP_VMGI at two positions, that is, TMP_VMGI on the innermost side and TMP_VMGI the outermost side.

Figure 9:
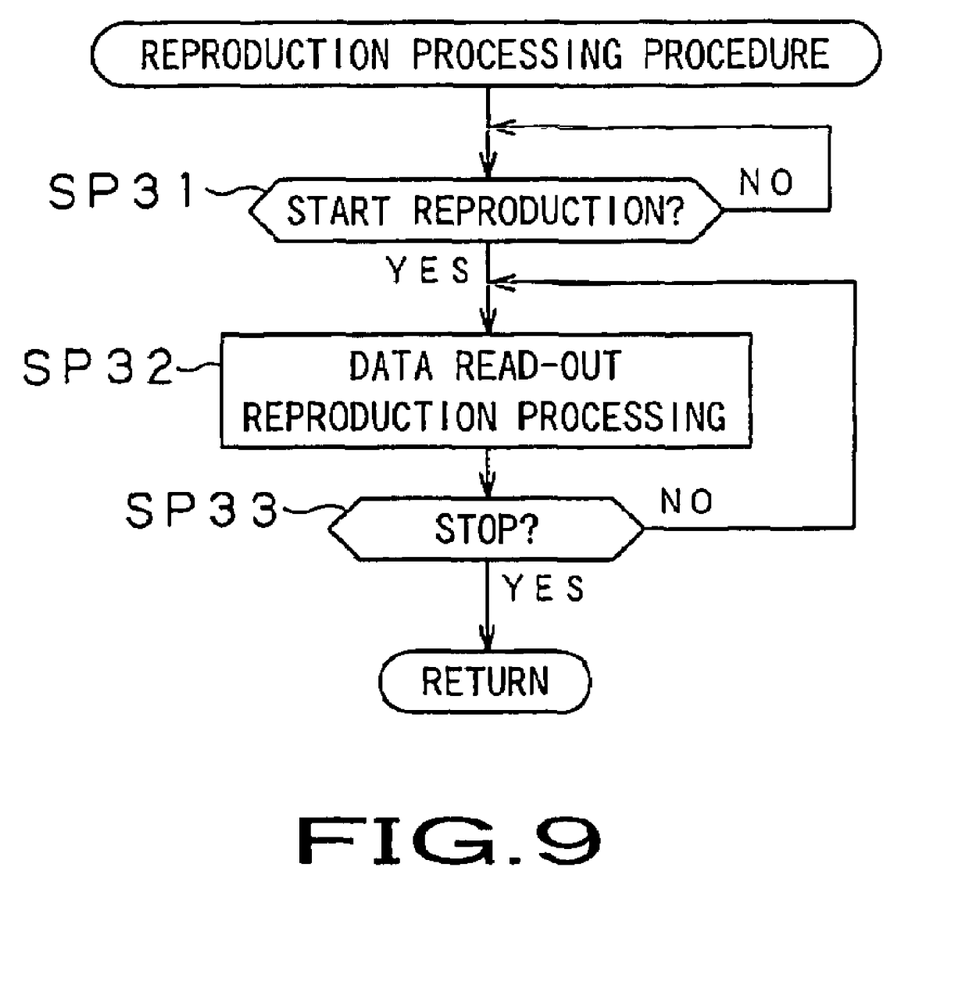
FIG. 9 is a flowchart showing reproduction processing procedure in the optical disc recording/reproducing apparatus according to the present invention.

FIG. 9 is a flowchart showing reproduction processing procedure. As the system controller 10 starts this reproduction processing procedure, the system controller 10 at step SP31 judges whether start of reproduction has been designated by the user or not. If the result is negative at this step, the system controller 10 repeats step SP31. On the other hand, if the result is positive, the system controller 10 shifts from step SP31 to step SP32. The system controller 10 controls the entire operation so as to reproduce an image file designated by the user, with reference to the management information recorded and held in the memory.

Specifically, in the case where the optical disc 2 is a finalized optical disc, the system controller 10 detects the recording position of the corresponding file by using VMG data held in the memory, and instructs each unit of the optical disc recording/reproducing apparatus 100 to perform reproduction from this recording position. On the other hand, in the case where the optical disc 2 is an optical disc that has not been finalized, the system controller 10 detects the recording position of the corresponding file by using TMP_VMGI, and VTSI and VTSTT VOBS of each title that are held in the memory, and instructs each unit of the optical disc recording/reproducing apparatus 100 to perform reproduction from this recording position.

After instructing each unit to perform reproduction in this manner, the system controller 10 shifts to step SP33 and judges whether stop of reproduction has been designated by the user or not. If the result is negative at this step, the system controller 10 returns to step SP32. The system controller 10 thus repeats the processing procedure steps SP32-SP33-SP32 and sequentially reproduces a motion picture file designated by the user. On the other hand, if the result is positive at step SP33, the system controller 10 ends the reproducing operation and ends this reproduction processing procedure.

Recording media such as magnetic disks, optical discs and magnetic tapes can be used. It should be understood by those ordinarily skilled in the art that the invention is not limited to the above-described embodiment described with reference to the drawings, but various modifications, alternative constructions or equivalents can be implemented without departing from the scope and spirit of the present invention as set forth and defined by the appended claims.

INDUSTRIAL APPLICABILITY

As described above, according to the present invention, every time a set made up of a file to be recorded and management information for the file is recorded into a user area on a rewritable optical disc while conforming to the recording format for a playback-only recording medium including at least a file containing recording information to be reproduced and management information for managing the recording information, and file management information for managing one or plural such files, a recording area for temporary management information for managing the file and management information for managing recording information of a file to be recorded next is secured, and the temporary management information for managing the file is recorded into the recording area while at least the temporary management information recorded on the innermost side is updated. Therefore, even when the temporary management information becomes unreadable because of update exceeding the rewriting durability of the medium with respect to the recording area for the temporary management information on the innermost side, the temporary management information recorded in the other recording area can be read and finalizing processing can be executed.

The invention claimed is:

1. An optical disc recording method for recording a set made up of a file to be recorded and management information of the file into a user area on a rewritable optical disc while conforming to a recording format for a playback-only recording medium including at least a file containing recording information to be reproduced and management information for managing the recording information, and file management information for managing one or plural files, the method comprising:

securing an innermost recording area for temporary management information for managing the file to be recorded in the user area, management information conformable to the recording format of the playback-only recording medium, and management information for managing recording information of the file to be recorded;

recording the temporary management information for managing a current file to the innermost recording area and subsequently recording the recording information of the current file to be recorded to a first recording area; recording the management information for managing the recording information of the current file to the first recording area so as to close the current file, then securing a next recording area for a next file to be recorded, the temporary management information for managing the current file and management information for managing recording information of the next file to be recorded, then recording the temporary management information for managing the current file to the next recording area, and rewriting the previously recorded temporary management information with a latest temporary management information; and every time a file is recorded, securing a next recording area for a next file to be recorded, the temporary management information for managing the current file and management information for managing recording information of the next file to be recorded, then recording the latest temporary management information for managing the current file to the next recording area, and updating the temporary management information recorded at least on the innermost recording area.

2. The recording method as claimed in claim 1, wherein every time a file is recorded, a recording area for the temporary management information for managing the file and management information for managing recording information of a file to be recorded next is secured, the temporary management information for managing the file is recorded into the recording area, and all the temporary management information that has already been recorded is updated.

3. The recording method as claimed in claim 1, wherein every time a file is recorded, a recording area for the temporary management information for managing the file and management information for managing recording information of a file to be recorded next is secured, the temporary management information for managing the file is recorded into the recording area, and only the temporary management information recorded on the innermost side is updated.

4. The recording method as claimed in claim 1, wherein when recording and closing a file, management information for managing recording information of that file is used to overwrite a temporary management information part recorded when closing a previous file, and the temporary management information at two positions, that is, the temporary management information on the innermost side and the temporary management information on the outermost side, are saved.

5. The recording method as claimed in claim 1, wherein as a recording format of the file and the management information, a DVD video format is used for the file, the medium is a DVD-RW (DVD-rewritable), the file is a VTS (video title set) in the DVD video format, the management information for managing recording information of the file is VMGI (video manager information) in the DVD video format, the DVD video file is managed by temporary VMGI (TMP_VMGI), and the DVD video file is recorded using a ROW (restricted overwrite) system.

6. An optical disc recording apparatus for recording a set made up of a file to be recorded and management information of the file into a user area on a rewritable optical disc while conforming to a recording format for a playback-only recording medium including at least a file containing recording information to be reproduced and management information for managing the recording information, and file management information for managing one or plural files, the apparatus comprising:

management information generation means for generating management information of a file to be recorded;

recording means for recording the set made up of the file and the management information of the file into the user area of the optical disc; and control means for controlling operation of at least the management information generation means and the recording means;

wherein the control means secures an innermost recording area for temporary management information for managing the file to be recorded in the user area, management information conformable to the recording format of the playback-only recording medium, and management information for managing recording information of the file to be recorded, then records the temporary management information for managing a current file to the innermost recording area, subsequently records the recording information of the current file to be recorded to the first recording area, then records the management information for managing the recording information of the current file to the first recording area so as to close the file, then secures a next recording area for a next file to be recorded, the temporary management information for managing the current file and management information for managing recording information of the next file to be recorded, then records the temporary management information for managing the current file to the next recording area, and rewriting the previously recorded temporary management information with a latest temporary management information, and every time a file is recorded, the control means secures a next recording area for a next file to be recorded, the temporary management information for managing the current file and management information for managing recording information of the next file to be recorded, then records the latest temporary management information for managing the current file to the next recording area, and updates the temporary management information recorded at least on the innermost recording area.

7. The recording apparatus as claimed in claim 6, wherein every time a file is recorded, the control means performs control to secure a recording area for the temporary management information for managing the file and management information for managing recording information of a file to be recorded next, then record the temporary management information for managing the file into the recording area, and update all the temporary management information that has already been recorded.

8. The recording apparatus as claimed in claim 6, wherein every time a file is recorded, the control means performs control to secure a recording area for the temporary management information for managing the file and management information for managing recording information of a file to be recorded next, then record the temporary management information for managing the file into the recording area, and update only the temporary management information recorded on the innermost side.

9. The recording apparatus as claimed in claim 6, wherein when recording and closing a file, the control means performs control to use management information for managing recording information of that file to overwrite a temporary management information part recorded when closing a previous file, and save the temporary management information at two positions, that is, the temporary management information on the innermost side and the temporary management information on the outermost side.

10. The recording apparatus as claimed in claim 9, wherein as a recording format of the file and the management information, a DVD video format is used for the file, the medium is a DVD-RW (DVD-rewritable), the file is a VTS (video title set) in the DVD video format, the management information for managing recording information of the file is VMGI (video manager information) in the DVD video format, and the control means manages the DVD video file by temporary VMGI (TMP_VMGI) and records the DVD video file using a ROW (restricted overwrite) system.

11. A computer readable information recording medium encoded with a computer control program so that the computer control program is readable by a control computer, the control computer controlling operation of management information generation means for generating management information of a file to be recorded and recording means for recording a set of a file and management information of the file into a user area of an optical disc, the management information generation means and the recording means being provided in an optical disc recording apparatus for recording the set made up of the file to be recorded and the management information of the file into the user area on the optical disc, the control program causing the control computer to function as control means for performing control to secure an innermost recording area for temporary management information for managing the file to be recorded in the user area, management information conformable to the recording format of the playback-only recording medium, and management information for managing recording information of the file to be recorded, then record the temporary management information for managing a current file to the innermost recording area, subsequently record the recording information of the current file to be recorded to a first recording area, then record the management information for managing the recording information of the current file to the first recording area so as to close the file, then secure a next recording area for a next file to be recorded, the temporary management information for managing the current file and management information for managing recording information of the next file to be recorded, then record the temporary management information for managing the current file to the next recording area, and rewrite the previously recorded temporary management information with a latest temporary management information, and every time a file is recorded, to secure a next recording area for a next file to be recorded, the temporary management information for managing the current file and management information for managing recording information of the next file to be recorded, then record the latest temporary management information for managing the current file to the next recording area, and update the temporary management information recorded at least on the innermost recording area.

* * * * *